April 21, 1953
F. A. THOMANN
2,635,409
COTTON-CATCHING SHELF MEANS FOR THE
PLANT PASSAGE OF COTTON PICKERS
Filed Aug. 14, 1950
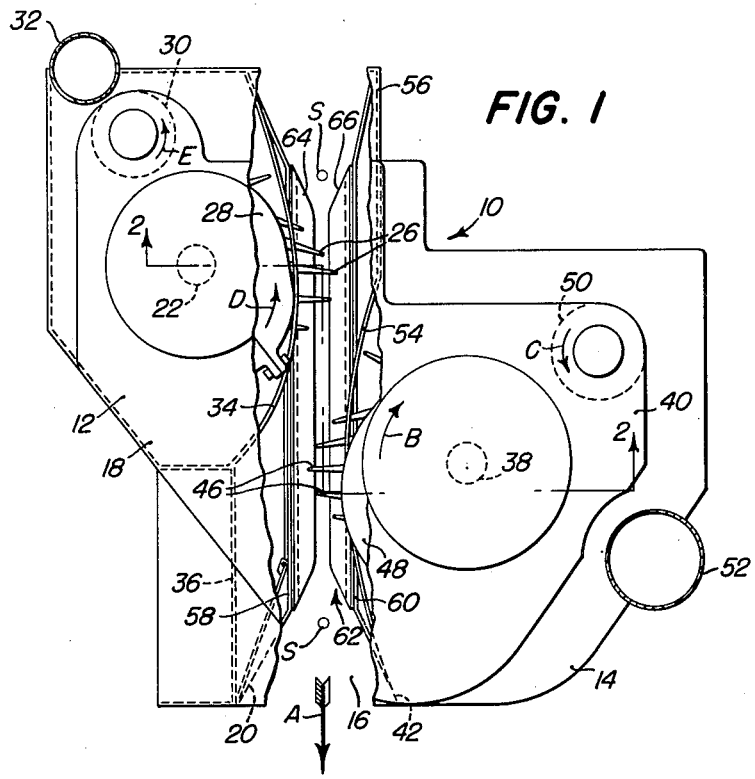
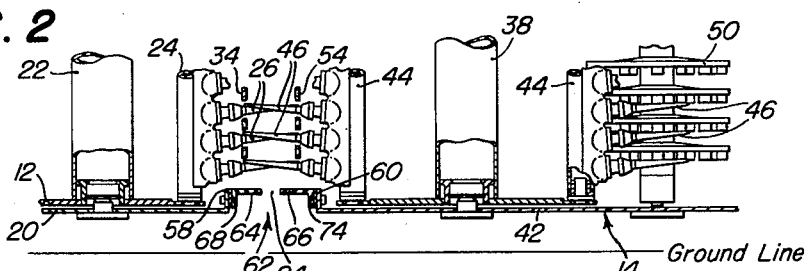
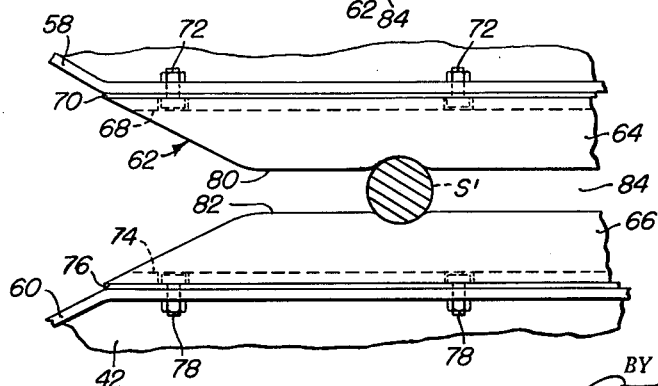
INVENTOR.
F. A. THOMANN
BY
ATTORNEYS Patented Apr. 21, 1953

2,635,409

UNITED STATES PATENT OFFICE 2,635,409

COTTON-CATCHING SHELF MEANS FOR THE PLANT PASSAGE OF COTTON PICKERS

Fred A. Thomann, Des Moines, Iowa, assignor to Deere Manufacturing Co., Dubuque, Iowa, a corporation of Iowa Application August 14, 1950, Serial No. 179,312

3 Claims. (Cl. 56—44)

This invention relates to a cotton picker and more particularly to floor or shelf means located at the bottom of the plant passage of the picker.

The invention is primarily adapted for use in a cotton picker of the type that utilizes a plurality of barbed rotating spindles as picking elements in a drum assembly rotatable generally about a vertical axis and spaced from an upright wall or equivalent structure in such manner as to define a narrow, longitudinally extending passage through which the cotton plants pass as the picking machine advances over the field. As the plants successively enter the passage the rotating spindles pick the cotton from the ripened bolls and by means of doffers or equivalent mechanism the picked cotton is removed from the spindles and transferred to conveying means for ultimate transfer to a suitable receptacle.

Since the picking spindles travel at a relatively high speed and since the cotton plants are somewhat compressed in the picking process, there is always the likelihood that some cotton will be knocked from the plants and fall to the ground. According to the present invention, floor or shelf means is provided at the bottom of the passage to catch the cotton that is knocked from the plants and that would otherwise fall to the ground. It is an important object of the invention to provide the shelf or floor means preferably in the form of a pair of longitudinally extending strips of rubber or the like disposed in a common horizontal plane and having inner edges spaced apart to define a longitudinal slot relatively narrower than the picking passage. The slot is of such width as to accommodate stalks of average thicknesses and the area of the imperforate portions of the shelf is effective to catch substantially all cotton knocked from the plants by the spindles; that is, cotton that is not wound on the spindles or picked by the spindles in normal fashion.

It is a further feature of the invention to construct the floor or shelf element of material that is resilient and that has the further characteristic of returning immediately to shape after temporary distortion, such as would occur when a stalk of excessive thickness passes through the passage or as would also occur in the event that the machine is steered slightly off the row.

It is an object of the invention to provide the floor or shelf means in such manner that it may be readily attached to machines of existing types.

The foregoing and other important objects and desirable features inherent in and encompassed by the invention will become apparent from the following detailed description of a preferred embodiment of the invention as shown in the accompanying sheet of drawings in which Figure 1 is a plan view of a picking unit of generally conventional construction, upper portions of the unit being broken away to expose interior parts;

Figure 2 is a fragmentary enlarged sectional view taken substantially on the line 2—2 of Figure 1; and Figure 3 is an enlarged fragmentary plan view showing more clearly the construction and arrangement of the shelf or floor means.

The cotton picker chosen for the purpose of illustration may be of the type forming the subject matter of the U. S. patent to Johnston 2,140,631; although, the principles of the invention may be adapted to pickers of other types. For present purposes, the invention will be described and illustrated in connection with the picker of the character first mentioned.

The picking unit shown here comprises housing structure designated generally by the numeral 10 that may be carried by a mobile frame such as a tractor (not shown) for travel forwardly or in the direction of the arrow A along a row of cotton plants, the stalks of which are illustrated schematically at S in Figure 1. The housing structure 10 is separated into right- and left-hand halves 12 and 14 (as viewed from the rear of the machine and looking forwardly) divided by a fore and aft or longitudinally extending plant-receiving passage 16. The passage 16 is relatively narrow and is defined at each side by upright fore and aft extending structure made up of mechanism and related components of the halves of the picking unit or housing, as will be described below.

The right-hand half 12 includes upper and lower plates 18 and 20 between which is journaled a vertical shaft 22 for carrying a picker drum made up of a plurality of vertical picker bars 24. There are several of these bars—from twelve to sixteen—and each has projecting therefrom a plurality of picking elements in the form of rotatable spindles 26. These spindles rotate at relatively high speed about their own axes and the entire drum structure rotates about the vertical axis of the shaft 22. The upper portion of the drum includes a cam, designated here generally by the numeral 28, which controls or guides the picker bars for movement through a somewhat elliptical orbit so that the spindles 26 move into and then out of the plant passage 16. The details of the orbital movement and the cam means for controlling the picker bars are generally conventional, being typified by the Johnston patent mentioned above.

While the spindles are projecting into the passage 16, as shown in Figure 1, they rotate, and, being barbed, pick cotton from the plants by winding the cotton on the spindles. As the machine advances, the spindles are moved rearwardly or retracted and pass through doffing mechanism, represented here only schematically by the dotted circle 30. The doffing mechanism removes the cotton from the spindles and the cotton is then transferred to conveying means which may be of any suitable type. That illustrated here includes a conduit 32 forming part of pneumatic conveying means.

Other components of the upright wall structure defining the right-hand side of the passage 16 include a plurality of vertically spaced grate bars 34 through which the spindles project, as shown in Figures 1 and 2. These bars are attached at their forward ends to a fore and aft extending wall 36.

The structure and mechanism of the left-hand half of the picking unit is substantially identical to that previously described. The left-hand unit includes a picking drum rotatable about the vertical axis of a shaft 38 journaled at its upper and lower ends in upper and lower plates 40 and 42 and carrying a plurality of picker or spindle bars 44. Each of these bars contains a plurality of rotatable picking elements such as spindles 46 which are identical to the spindles 26 previously described. The drum including the shaft 38 and spindles 46 is offset forwardly from the axis of the right-hand drum so that the spindles 46 enter the plant passage 16 ahead of the spindles 26 and at the opposite side. The function of these spindles 46 is the same as that ascribed to the spindles 26. The picker bars 44 are controlled by a cam 48 so that the spindles move into and then out of the passage for movement in the direction of the arrow B to doffing mechanism 50, which removes cotton from the spindles and transfers it to a conduit 52 forming part of the pneumatic conveying system. The doffing mechanism rotates in the direction of the arrow C. The right-hand drum rotates in the direction of the arrow D and the right-hand doffer mechanism rotates in the direction of the arrow E.

The left-hand side of the upright wall structure made up in part of the spindles 46 includes longitudinally running, vertically spaced grate bars 54 extending to the front of the passage 16 and terminating at their rear ends in a longitudinal upright wall 56.

The lower plates 20 and 42 of the picking unit provide bottom structure lying generally in a common horizontal plane and having inner terminal edges lying generally in the vertical plane of the upright structure that defines the plant passage 16. As best shown in Figure 2, the inner or terminal edge of the plate 20 has an upturned flange 58. A similar flange 60 is formed on the inner edge of the plate 42. These flanges are spaced apart on the order of the general transverse dimension of the plant passage 16.

To the extent described thus far, the mechanism is substantially conventional. Because of the wide spacing between the flanges 58 and 60, it has been found in the past that considerable cotton, inadvertently knocked from the plants— that is, not picked by wrapping on the spindles— has fallen to the ground and is lost. According to the present invention, this disadvantage is eliminated by the provision of floor or shelf means designated generally by the numeral 62. This floor or shelf means comprises a pair of fore and aft extending strips or shelf elements 64 and 66 formed of rubber or equivalent resilient nonmetallic material capable throughout its effective length of localized transverse yielding of portions thereof independently of longitudinally spaced other portions thereof and having the further characteristic throughout its effective length of returning immediately to normal shape after temporary deformation or distortion. Each strip is in the form of an L-shaped member in section to provide a mounting flange for mounting on the bottom structure of the picking unit. The flange on the element 64 is designated by the numeral 68 and this flange is preferably bonded to a longitudinally extending metallic strip 70 through which a plurality of bolts 72 may be passed for attaching the assembly to the flange 58 on the bottom plate 20.

The other element 66 is flanged at 74 and backed up by a metallic strip 76 which receives a plurality of bolts 78 for attachment to the flange 60 of the bottom plate 42 of the left-hand half of the picking unit. The shelf elements are arranged so that their upper portions lie in a common horizontal plane at the bottom structure and immediately below the path through which the lowermost picking elements or spindles 26 and 46 pass or sweep through the plant passage. The element 64 has an inner fore and aft extending edge 80 which is relatively closely spaced transversely from an inner fore and aft extending edge 82 of the companion shelf element 66. The two inner edges define a relatively narrow, fore and aft extending through slot 84 that is considerably narrower than the transverse dimension of the passage 16. Stated otherwise, the slot 84 is of such transverse width as to prevent the dropping therethrough of cotton knocked from the plants by the spindles 26. On the other hand, the slot 84 is sufficiently wide to receive or accommodate stalks of average thickness. Yet, the resiliency or yieldability of the members is such that the slot may temporarily widen to accommodate stalks of excessive thickness, as indicated at $S^1$ in Figure 3. Since the elements 64 and 66 are capable of localized transverse yielding of portions thereof independently of longitudinally spaced other portions, the slot 84 will be widened only at the points of contact of the elements 64 and 66 with the particular stalks being accommodated. Thus, the cotton-catching characteristics of the shelf means 62 are retained throughout operation of the picker.

The upper surface of each of the elements 64 and 66 is smooth and continuous throughout the effective length of the member. Since the elements lie immediately below the lowermost picking spindles 26 and 46, any cotton that drops to the elements will be engaged by the lowermost spindles and, if not actually wrapped on these spindles, will be moved rearwardly and ultimately to the pneumatic conveying system by being swept along the elements in a rearward and inward direction.

Since the elements 64 and 66 are yieldable, guiding of the machine off the row to one side or the other, either accidentally or to accommodate irregularities in planting, will cause merely temporary distortion or deformation of one or the other of the elements. Another characteristic of the elements 64 and 66 is that they are imperforate and serve to prevent large quantities of grass or weeds from projecting upwardly into the plant passage. That is, as the machine advances, the elements 64 and 66 will serve to depress the taller grasses.

Because of the provision of the elements 64 and 66 in the form illustrated, they may be readily attached to machines of existing types, primarily because of the arrangement of the mounting flanges thereon. However, other forms of the principle of the invention may be readily adapted.

Various other features and advantages not specifically enumerated herein will undoubtedly occur to those skilled in the art, as will numerous modifications and alterations in the preferred structure illustrated, all of which may be accomplished without departing from the spirit and scope of the invention as defined in the appended claims.

What is claimed is:

1. In a cotton picker movable forwardly along a row of ground-borne cotton plants and having picking means including bottom structure closely spaced above the ground and upright fore and aft extending structure adjoining the bottom structure to provide an upright fore and aft extending, relatively narrow passage in which plants are received as the picker advances and through which vertically spaced picking elements travel from front to rear to pick cotton from the plants, the improvement residing in shelf means for mounting at the bottom of the passage to catch cotton knocked from the plants, comprising: a pair of shelf elements having means thereon for the mounting thereof on the picking means respectively at opposite sides of the passage and in a common horizontal plane substantially at the level of the bottom structure and immediately below the lowermost picking elements, each shelf element being elongated to extend fore and aft in the passage and each element extending partially across the passage and terminating in an inner fore and aft edge closely spaced from the inner fore and aft edge of the other element to provide a fore and aft extending slot substantially narrower than the width of the passage and of such width as to readily accept ground-borne stalks of average thickness, each element having its said inner edge continuous and smooth throughout its effective length and likewise having an upper surface that is continuous and smooth throughout its effective length, each shelf element being constructed of resilient non-metallic material capable throughout its effective length of localized transverse yielding of portions thereof independently of longitudinally spaced other portions thereof to accommodate ground-borne stalks of excess thicknesses, and such material having the further characteristic throughout its effective length of returning immediately to normal shape after passing such stalks.

2. In a cotton picker movable forwardly along a row of ground-borne cotton plants and having picking means including bottom structure closely spaced above the ground and upright fore and aft extending structure adjoining the bottom structure to provide an upright fore and aft extending, relatively narrow passage in which plants are received as the picker advances and through which picking elements travel from front to rear in a path sweeping close to the bottom structure, the improvement comprising: means providing a shelf for the bottom of the passage immediately below the path of travel of the picking elements, said shelf means having provision for the mounting thereof on the picking means and including a pair of transversely spaced apart shelf elements respectively having inner fore and aft edges defining a fore and aft extending through slot of such width as to readily accept ground-borne stalks of average thickness, at least one of said shelf elements having its inner edge continuous and smooth throughout its length and constructed of resilient non-metallic material capable throughout its effective length of localized transverse yielding of portions thereof independently of longitudinally spaced other portions thereof to accommodate ground-borne stalks of excess thicknesses, and such material having the further characteristic throughout its effective length of returning immediately to normal shape after passing such stalks.

3. In a cotton picker movable forwardly along a row of ground-borne cotton plants and having picking means including bottom structure closely spaced above the ground and upright fore and aft extending structure adjoining the bottom structure to provide an upright fore and aft extending, relatively narrow passage in which plants are received as the picker advances and through which picking elements travel from front to rear in a path sweeping close to the bottom structure, the improvement comprising: a rubber shelf having means thereon for the mounting thereof across and extending from front to rear of the passage immediately below the path of the picking elements, said shelf having a fore and aft extending through slot centered on the fore and aft centerline of the passage and of such width as to readily accept ground-borne stalks of average thickness and yieldable laterally to provide for increase in width of portions of the slot to accommodate stalks of excessive thickness.

FRED A. THOMANN.

References Cited in the file of this patent

UNITED STATES PATENTS

| Number | Name | Date |
|---|---|---|
| 1,731,826 | Morava | Oct. 15, 1929 |
| 2,153,896 | Mohar | Apr. 11, 1939 |
| 2,333,965 | Weems | Nov. 9, 1943 |